Jan. 16, 1968 A. A. JORGENSEN 3,364,312
STOPPING MULTIPLE SWITCHES AT DIFFERENT POSITIONS
IN A SINGLE SCANNING CYCLE
Filed June 25, 1964 2 Sheets-Sheet 1

INVENTOR

Adam A. Jorgensen,

BY Watson, Cole, Grindle, & Watson

ATTORNEYS

INVENTOR
Adam A. Jorgensen,

BY Watson, Cole, Grindle & Watson
ATTORNEYS

United States Patent Office 3,364,312
Patented Jan. 16, 1968

3,364,312
STOPPING MULTIPLE SWITCHES AT DIFFERENT POSITIONS IN A SINGLE SCANNING CYCLE

Adam A. Jorgensen, Charlottesville, Va., assignor to Stromberg-Carlson Corporation, a corporation of Delaware Filed June 25, 1964, Ser. No. 377,949
4 Claims. (Cl. 179—18)

ABSTRACT OF THE DISCLOSURE

Telephone scanning circuits are disclosed in which a plurality of switches are scanned through a single cycle to select different positions on each switch. Thus, a set of distinctive signals, such as time multiplexed pulses, is chosen and a different signal in the set is allocated to each switch. A different signal from the set is also used to mark each contact position on each switch. Then, by coincidence detection of the same signal at the switch and the respective contact each switch is stopped during the scanning cycle at a unique selected contact position.

This invention relates to switching control circuits and more particularly it relates to switching circuits useful in selecting telephone lines by scanning a series of lines to select the desired one.

Telephone switching circuits used in line finding are frequently overtaxed during heavy traffic periods, resulting in busy signals at the switching office even when the called line itself may be free. This requires either a redirected call at a time that the switching circuits are free, or the use of number storage devices which await an open line before completing a call in the system. In general, to increase the capacity of the switching system for processing all calls at the peak load periods, the cost becomes high and results in a low average duty cycle use of the equipment during other periods.

In several types of telephone switching systems, the switches are positioned by means of electrical markings placed on the switch banks. One switch at a time may search for its corresponding mark. Obviously only one switch at a time can be allowed to search in order to prevent a switch from being positioned falsely by stopping at a marking intended for another switch.

Since only one switch at a time can be positioned, delays are introduced which either give rise to a lower grade of service or increased equipment cost.

Accordingly, it is an object of the invention to provide a switching system which permits selection of a multiplicity of lines on different switches during a single search scanning cycle through a switch bank and so that all switches may search simultaneously to thus afford efficient use of switching equipment and to reduce waiting time for access to the selected lines.

A general object of the invention is to provide improved telephone switching circuits.

Another object of the invention is to provide higher speed switching circuits which select a desired line in less time.

The present invention therefore circumvents the disadvantage of prior art selection circuits which block access to the entire bank of switches while scanning for selection of only one line in the bank. An allocation principle is employed enabling a multiplicity of switches in the bank to be selected during a single scanning cycle. Different switches in the bank are thus isolated from each other by allotting distinctive time shared pulse trains respectively to the different switches. Then selection is made by sending a group of corresponding multiplexed marking pulse trains to designated switch contacts in the bank for comparison with the allotted pulse trains at each individual switch, so that several lines may be selected simultaneously at corresponding switches during a single search cycle. The time sharing of the pulse trains permits a single lead to convey a multiplicity of marking signals simultaneously to contacts upon various switches in the bank.

Construction and operation of the equipment afforded by this invention will be described in connection with specific embodiments set forth in the accompanying drawing, wherein.

Figure 1:
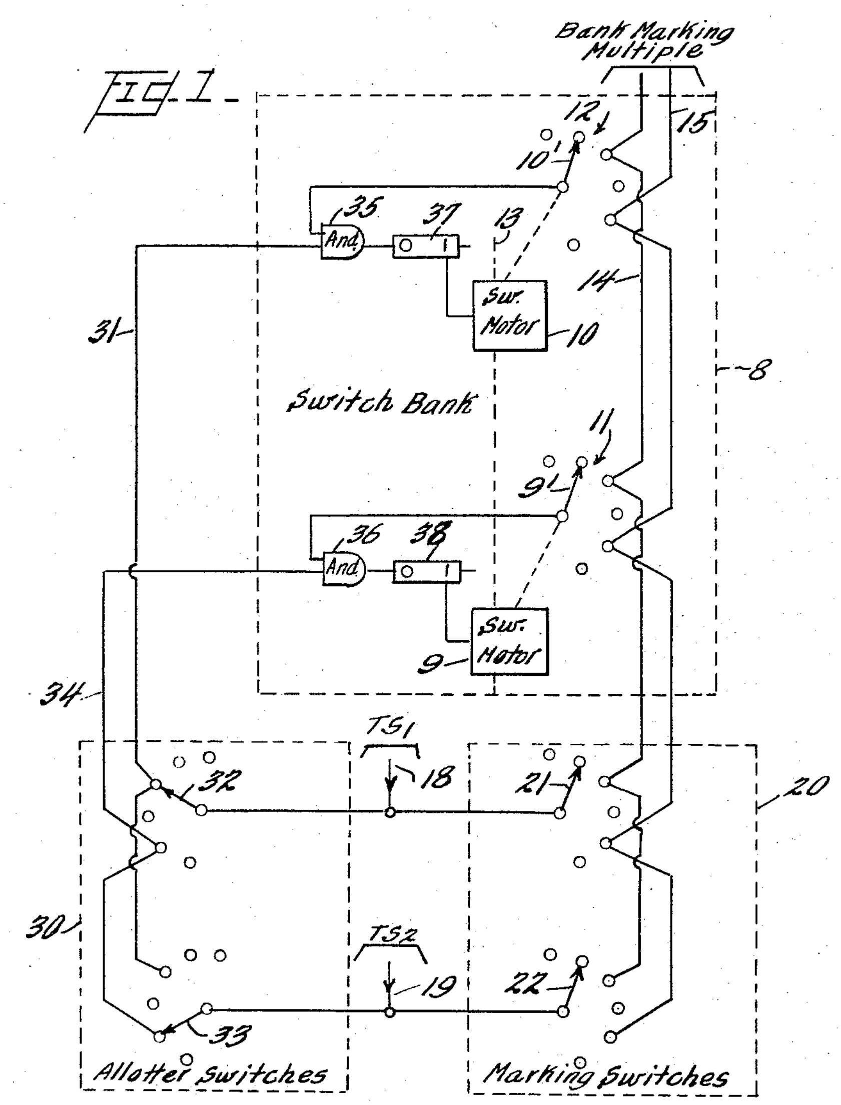
FIGURE 1 is a fragmentary circuit diagram of that part of a switching control system embodying the invention to search and select a particular line or switch contact.

In order to avoid the complex presentation of the well known multiple elements of a telephone switching system, which thereby would tend to obscure the nature of the invention, FIGURE 1 is directed only to that portion of searching and selecting control circuits which might be found in a typical telephone office to designate or find a line coupled to a particular switch contact. Typical well known searching configurations for line finding with step-by-step rotary switches are outlined in a pamphlet entitled "Basic Circuits" published by Automatic Electric Company, Northlake, Ill. Rotary switches and switch motors with their construction details are well known and are shown diagrammatically in the drawing, it being also recognized that this invention is not to be limited to a particular type of switching device although having considerable merit with motor driven rotary switches.

A switch bank 8 may contain a series including any reasonable number of switches represented by two typically connected switches having controllable scanner switch motor means 9, 10 and corresponding contact decks having wiper arms 9', 10' for scanning across decks of contacts 11, 12 by operation of the switch motors. In use, such a switching bank would require several decks of contacts for each switch, where two sets would generally serve to transmit the intelligence for which the system is intended, such as connecting a telephone line to a selected trunk line. The switch contact decks 11, 12 represent control positions. Thus wiper arms 9', 10' may scan the switch bank simultaneously searching for a marked terminal upon which the switch is to stop to connect the designated line on the unshown switch decks. Thus the motors may be simultaneously energized as shown by dotted line 13 whenever a searching cycle is initiated. For purpose of understanding the improved selection operation of the present invention, the other unrelated control and intelligence positions on supplemental switch decks need not be shown.

In order to mark the switch contact sets 11, 12 in the bank for stopping at a selected contact position, the bank marking multiple has single conductor leads 14, 15 connected to representative contacts on each of the switch decks 11, 12. Conventionally the single marking signal employed has been either the presence or absence of a potential at one of the switch contacts in a deck. In accordance with this invention, however, a group of time shared signals TS1, TS2, etc. are coupled to lines in the marking multiple by the marking switch control section 20 through wiper arms 21, 22, etc. respectively coupled to time slot generator output leads 18, 19.

Figure 2:
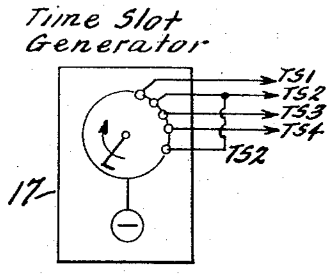
FIGURE 2 is a diagrammatic representation of a time slot generator for producing a series of pulse trains.
Figure 3:
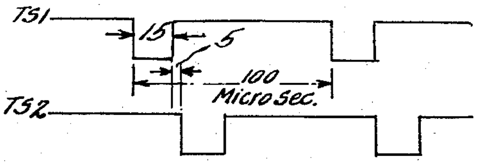
FIGURE 3 is a waveform diagram setting forth the timing relationship of pulse trains used in the selection of a switch in accordance with the principles of this invention.

These time shared signals TS1, etc. may be generated as shown by the time slot generator 17 of FIGURE 2, which represents a continuously rotatable switch having periodically scanned contacts coupled in groups to corresponding timing signal leads, TS2, for example. Electronic pulse generators of conventional design would normally be used if desirable for generating the set of distinctive signals. This generates a group of marking signals as identified in FIGURE 3, which provides for four simultaneous multiplexed pulse signals trains with fifteen microsecond pulses, five microsecond guard zones between pulses in different sets of signals, and a repetition rate of 10,000 pulses per second. With the illustrative sets of signals, the four time slots TS1 to TS4 may exist simultaneously in the common bank illustrated by leads 14, 15. These above values are arbitrarily chosen and may have entirely different values in different systems.

Thus the marking switch arms 21, 22 serve to designate the different switch contacts connected to the multiple marker leads in switch bank 8 with distinctive signals. These marking switches need not be rotary switches, but represent a switching control system for selectively marking designated contacts or switches in bank 8 with the multiplicity of distinctive signals TS1–TS4.

Allotter switch section 30 serves to connect a single one of the distinctive signals TS1, etc., to a corresponding single switch 9, 10 in the switch bank 8. Thus, line 31 conveys to switch 10 signals TS1 when wiper arm 33 connects therewith. Therefore in the shown positions of allotter switch wiper arms 32, 33, signal TS1 is conveyed to switch 10 via lead 31 and signal TS2 is conveyed to switch 9 via lead 34 so that the different switches in bank 8 may be identified with different distinctive searching signals.

Now in searching, the two switches 9, 10 in the switching bank 8 can be scanned simultaneously, since switch 9 is instructed to look only for time slot 1 or signal TS1, whereas switch 10 looks only for TS2. When any signal is found at a switch control position in decks 11, 12, the corresponding wiper arm 9′, 10′ will serve to compare and match the signal with the allotted signal at leads 31, 34 in the corresponding AND circuit comparator means 35 or 36. When both pulse trains coincide, the comparator sets a relay or flip-flop circuit 37, 38 to stop the switch scanning motor 9, 10 at the selected contact by braking or removing stepping current, etc. depending upon the nature of the scanner motor.

Therefore both switches 9 and 10 in bank 8 can hunt simultaneously and stop independently on a designated contact. The principle can be expanded to as large a number of simultaneous selections as desired, or may be incorporated into existing systems by slight modifications thus improving the speed at which a line may be searched and selected.

Figure 4:
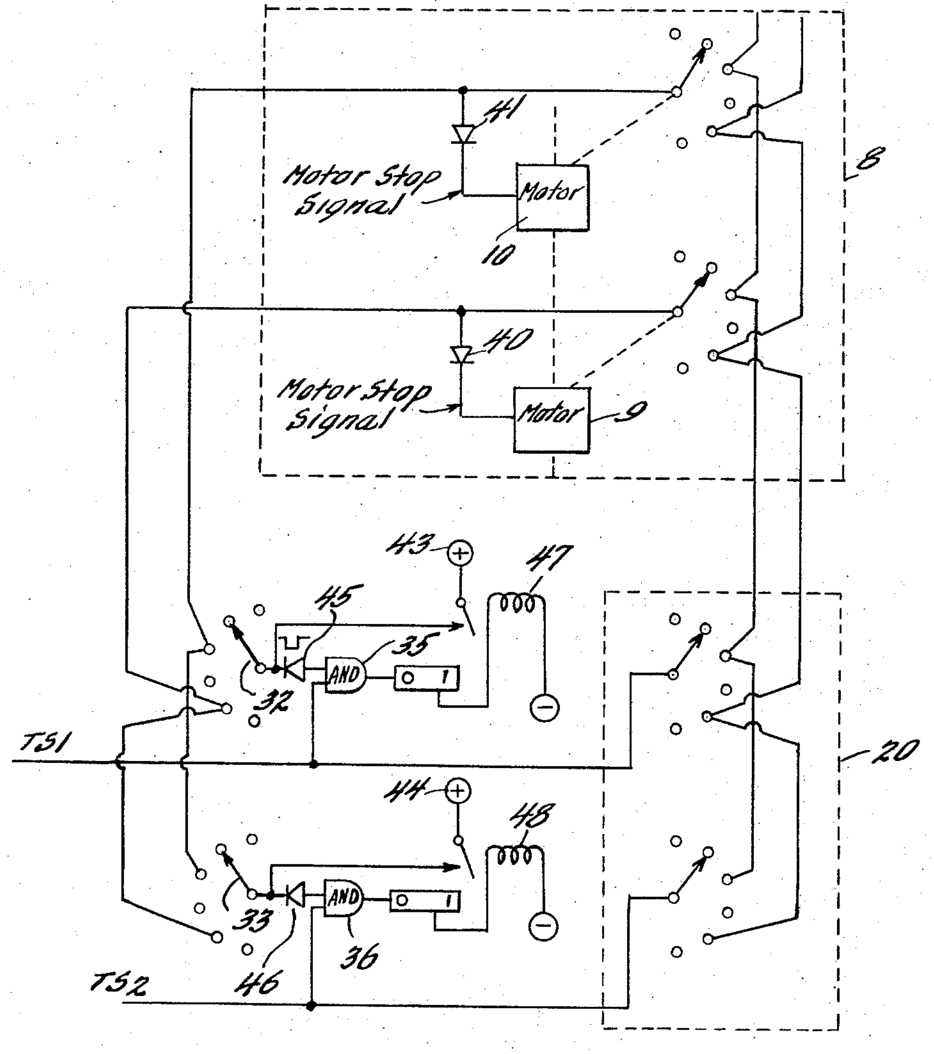
FIGURE 4 is a circuit diagram of a further switching control system embodying the invention.

Variations to the equipment connections may be typified by the embodiment of FIGURE 4, where the comparator circuits need not be provided for each switch in the banks 8, etc., but are commonly pooled for use with any of the switches encountered by the allotter section.

In order to control the stopping of switch motors 9 and 10, in this embodiment, the diodes 40, 41 are provided to bypass negative marking signals but to pass positive signals from leads 43, 44. Also isolating diodes 45, 46 block the positive signals from leads 43, 44 from comparator circuits 35, 36. Thus the motor braking means is responsive to a positive potential and the marking signals comprise a series of negative pulses in this system.

This embodiment has relays 47, 48 energized upon matching of signals at the AND circuits 35, 36 to connect the plus potential at leads 43, 44 to the motors 9, 10 to brake them and stop the switch wiper arms at the designated switch position. Thus by combining the allotter switches and comparison circuits, a more efficient circuit configuration is possible in any system where many selection switches and switch banks occur relative to the number of allotter switches.

In accordance with the novel principles afforded by this invention therefore several switches in a bank may be searched simultaneously and stopped independently upon a designated position. Those novel features representative of the invention are defined with particularity in the following claims.

I claim:

1. In a switching system having searching and selection control circuits including a series of multiple position selectable switches arranged in a bank, each switch having a controllable scanning device, means for scanning the switches of the bank simultaneously through their multiple positions in a single search cycle to set at least two different designated unique switches in two different selected positions and means to stop each designated unique switch in the series at said selected position, wherein separate control positions each with a sequence of switching contacts is afforded on the switches for establishing said unique selection condition at a different one of the contacts on each switch, a generator of a series of distinctive multiplexed marking signal trains, selectable switching means connected for selectively coupling uniquely to different switching contacts of each switch in said control positions different ones of said multiplicity of signal trains, further selectable switching means allotting a single one of said signal trains to different switches in said bank, and comparison means connected for controlling said scanning device to stop the switch only when the distinctive marking signal allotted to the switch coincides with the same marking signal coupled at one of the contacts in its control position.

2. The system defined in claim 1 wherein the comparison means comprises a separate signal matching circuit coupled to control the scanning device of each switch in said bank.

3. The system as defined in claim 1 wherein the comparison means is coupled to said further means allotting the signal trains and comprises a separate signal matching circuit for each distinctive signal train allotted to the switches in said bank.

4. The method of scanning through a set of multiposition switches over a single cycle and selecting a designated different contact for each switch, when the switches are coupled in a bank with means for simultaneously scanning through corresponding positions of all switches in the bank, comprising the steps of (a) providing a set of distinctive signals,
(b) allotting a single distinctive signal from said set to each different switch in said bank,
(c) selectively designating different contact positions of each switch in the bank with the different distinctive signals in a predetermined manner,
(d) comparing the allotted signal at a switch with each position of the switch to determine the contact position at which a signal match is encountered, and
(e) terminating the scanning of each switch whenever said signal match is encountered.

References Cited

UNITED STATES PATENTS 2,739,185 3/1966 Panzerbieter et al. __ 179—18.9

KATHLEEN H. CLAFFY, *Primary Examiner.*

L. A. WRIGHT, *Assistant Examiner.*